(12) United States Patent
Zhang et al.

(10) Patent No.: US 12,473,980 B2
(45) Date of Patent: Nov. 18, 2025

(54) GAS CYLINDER VALVE ASSEMBLY

(71) Applicant: TAIZHOU HENGXIN VALVE TECHNOLOGY CO., LTD., Zhejiang (CN)

(72) Inventors: Wenjin Zhang, Zhejiang (CN); Guofu Ying, Zhejiang (CN); Xingyuan Chen, Zhejiang (CN)

(73) Assignee: TAIZHOU HENGXIN VALVE TECHNOLOGY CO., LTD., Taizhou (CN)

( * ) Notice: Subject to any disclaimer, the term of this patent is extended or adjusted under 35 U.S.C. 154(b) by 196 days.

(21) Appl. No.: 18/370,479

(22) Filed: Sep. 20, 2023

(65) Prior Publication Data

US 2024/0401703 A1 Dec. 5, 2024

(30) Foreign Application Priority Data

Jun. 1, 2023 (CN) .......................... 202310645761.1

(51) Int. Cl.
*F17C 13/04* (2006.01)
*F16K 1/30* (2006.01)
*F16K 1/46* (2006.01)
*F16K 15/02* (2006.01)

(52) U.S. Cl.
CPC ............... *F16K 1/303* (2013.01); *F16K 1/46* (2013.01); *F16K 15/026* (2013.01); *F17C 2205/0332* (2013.01)

(58) Field of Classification Search
CPC .............. F17C 13/04; F17C 2205/0323; F17C 2205/0332; F17C 2205/0394; Y10T 137/1789
See application file for complete search history.

(56) References Cited

U.S. PATENT DOCUMENTS

| | | | | |
|---|---|---|---|---|
| 4,907,617 A * | 3/1990 | Whalen | ................. | F16K 17/406 137/71 |
| 5,144,973 A * | 9/1992 | Green | ..................... | F17C 13/12 137/71 |
| 5,941,268 A * | 8/1999 | Ross, Jr. | ................. | F17C 13/04 137/71 |
| 8,646,478 B2 * | 2/2014 | Nunez | ..................... | F16K 27/07 137/315.27 |

\* cited by examiner

*Primary Examiner* — Kevin F Murphy
(74) *Attorney, Agent, or Firm* — Cooper Legal Group, LLC

(57) ABSTRACT

A gas cylinder valve assembly includes a valve body and a valve rod, an end of the valve body is configured to connect with a gas cylinder, a first end face of the valve body facing the gas cylinder is configured with a fluid channel, a second end face of the valve body departing from the gas cylinder is defined with a cavity, a first stepped surface is provided at a connection between the cavity and the fluid channel, the valve rod is connected with an elastic element, an elastic force of the elastic element drives an end face of the valve rod to abut against the first stepped surface to form a sealing trend; a circumferential outer wall of the valve rod in the cavity is defined with a cutting slot, and a breaking zone is formed at a position corresponding to the cutting slot.

8 Claims, 2 Drawing Sheets

GAS CYLINDER VALVE ASSEMBLY

CROSS-REFERENCE TO RELATED APPLICATION

The present application is based on and claims the priority benefits of China application No. 202310645761.1, filed on Jun. 1, 2023. The entirety of China application No. 202310645761.1 is hereby incorporated by reference herein and made a part of this specification.

TECHNICAL FIELD

The present application relates to a technical field of valve, and in particular, relates to a gas cylinder valve assembly.

BACKGROUND ART

A gas cylinder valve refers to a valve installed on a gas cylinder to control the flow-off and the flow of the gas. The gas cylinder valve includes a valve body and a valve core, a fluid channel is configured in the valve body, the valve core is slidably connected to an inner wall of the fluid channel. The flow-off of the fluid channel is achieved through a reciprocating movement of the valve core, thereby achieving an exhaust and an intake of the gas cylinder.

When a gas cylinder filled with dangerous goods such as nitrous oxide is transported, the gas cylinder valve closes an inner cavity of the gas cylinder, so that nitrous oxide and other dangerous goods are stored in the inner cavity of the gas cylinder and do not tend to overflow.

When a transport truck loaded with dangerous goods such as nitrous oxide is collided during transportation, valve rods of adjacent gas cylinder valves collide with each other and slide, such that the closed effect of the gas cylinder valve on the inner cavity of the gas cylinder disappears, nitrous oxide and other dangerous goods in the gas cylinder are easy to overflow from the gas cylinder valve, and a transport personnel tends to be poisoned by breathing in the nitrous oxide and other dangerous goods, which would jeopardize the health of the transport personnel.

SUMMARY

In order to improve a problem that a gas cylinder valve is opened due to a collision during transportation of gas cylinders, a gas cylinder valve assembly and a production process are disclosed.

In a first aspect, the gas cylinder valve assembly disclosed adopts the following technical solution.

A gas cylinder valve assembly includes a valve body and a valve rod, an end of the valve body is configured to connect with a gas cylinder, a first end face of the valve body facing the gas cylinder is configured with a fluid channel, a second end face of the valve body departing from the gas cylinder is defined with a cavity, the cavity is in communication with the fluid channel, a first stepped surface is provided at a connection between the cavity and the fluid channel, a first end of the valve rod passes through the fluid channel and the cavity in sequence and protrudes from the second end face of the valve body, a second end of the valve rod is located in the fluid channel, the valve rod is connected with an elastic element, an elastic force of the elastic element drives an end face of the valve rod to abut against the first stepped surface to form a sealing trend; a circumferential outer wall of the valve rod in the cavity is defined with a cutting slot, and a breaking zone is formed at a position corresponding to the cutting slot.

By adopting the above technical solution, the end of the valve body is mounted at the gas cylinder. When the gas is injected into the cavity, the gas pressure drives the valve rod to slide departing from the first stepped surface, and the abutment force between the outer wall of the valve rod and the first stepped surface disappears, such that the cavity is in communication with the fluid channel, the gas passes through the cavity and the fluid channel in sequence and is stably injected into the inner cavity of the gas cylinder. When the inner cavity of the gas cylinder is filled with the gas, the elastic force of the elastic element drives the outer wall of the valve rod to abut against the first stepped surface to form a seal, making it difficult for the gas in the gas cylinder to overflow through the gas cylinder valve assembly, thereby ensuring a storage stability of the gas cylinder. When the gas cylinder is required to be transported, the staff breaks off the valve rod along the breaking zone of the cutting slot, such that the end of the valve rod is located in the cavity, thereby the adjacent valve rods don't tend to collide and squeeze with each other, which leads to a gas leakage, thereby ensuring the sealing stability of the gas cylinder valve assembly to the inner cavity of the gas cylinder during transportation, dangerous goods such as nitrous oxide in the gas cylinder are not easy to overflow from the gas cylinder valve assembly, and transport personnel are not easy to be poisoned by breathing in nitrous oxide and other dangerous goods, thus ensuring the health of the transport personnel.

Optionally, the valve body is connected with a element, the element includes a spring clamp and a column, the column is coaxially connected to the end of the valve body departing from the valve rod, an end face of the column facing the valve rod is defined with a hole, the hole is in communication with the fluid channel, and the end face of the column is configured to abut against an outer wall of the valve rod to form a seal, the spring clamp is connected to the outer wall of the valve rod protruding from the valve body, and when a gas pressure drives the valve rod to slide, an end face of the spring clamp abuts against the outer wall of the valve body, preventing the outer wall of the valve body from abutting against an outer wall of the column.

By adopting the above technical solution, when the gas cylinder is inflated, the gas enters the cavity, and the gas pressure drives the valve rod to slide in the direction towards the column, the end face of the spring clamp abuts against the end face of the valve body, thereby preventing the outer wall of the valve rod from abutting against the end face of the column, the gas passes through the cavity, the fluid channel, and the hole in sequence and is stably injected into the inner cavity of the gas cylinder; when the gas cylinder is transported, the staff breaks off the valve rod along the breaking zone of the cutting slot, and partial valve rod connected with the spring clamp is detached from the valve body. When the gas cylinder filled with dangerous goods such as nitrous oxide was exhausted, the outlaw wants to inject nitrous oxide gas into the exhausted gas cylinder, the gas pressure would drive the valve rod to slide, and the outer wall of the valve rod abuts against the end face of the column to form a seal, achieving the separation of the fluid channel and the hole, such that nitrous oxide gas cannot be stably injected into the gas cylinder again, thereby avoiding the reuse of the gas cylinder, thereby reducing the occurrence of illegal events by criminals and improving the stability of social security.

Optionally, the valve body is connected with an explosion-proof element, the outer wall of the valve body is defined with an explosion-proof cavity for accommodating the explosion-proof element, the explosion-proof cavity is in communication with the fluid channel, the explosion-proof element includes a safety sheet, a circumferential outer wall of the safety sheet abuts against an inner wall of the explosion-proof cavity to form a seal, and when the gas pressure in the fluid channel increases, the safety sheet is squeezed to rupture.

By adopting the above technical solution, when the fluid channel is blocked, the gas pressure in the fluid channel increases and ruptures the safety sheet, so that the sealing effect of the safety sheet on the explosion-proof cavity disappears, such that the gas in the fluid channel is discharged through the explosion-proof cavity, achieving a depressurization in the fluid channel, thereby reducing an occurrence of the burst of the gas cylinder and improving the filling stability of gas in the gas cylinder.

Optionally, the explosion-proof element further includes a sealing pad, and an outer wall of the sealing pad abuts against an outer wall of the safety sheet to form a seal with a bottom wall of the explosion-proof cavity.

By adopting the above technical solution, the outer wall of the sealing pad abuts against the outer wall of the safety sheet to form a seal with the inner wall of the explosion-proof cavity, making it difficult for the gas in the fluid channel to overflow from the connection between the safety sheet and the inner wall of the explosion-proof cavity, further improving the sealing stability of the gas cylinder valve assembly.

Optionally, the inner wall of the explosion-proof cavity is connected with an abutment ring, and an outer wall of the abutment ring abuts against the outer wall of the sealing pad to form a seal.

By adopting the above technical solution, when the outer wall of the sealing pad abuts against the safety sheet to form a seal with the inner wall of the explosion-proof cavity, the outer wall of the abutment ring compresses the outer wall of the sealing pad, such that the outer wall of the sealing pad deforms, and the outer wall of the abutment ring abuts against the outer wall of the sealing pad to form the seal, further improving the sealing stability of the sealing pad to the explosion-proof cavity.

Optionally, the explosion-proof element further includes a clamping screw, the clamping screw is screwed to the inner wall of the explosion-proof cavity, the clamping screw drives the safety sheet to abut against an end face of the sealing pad to form a seal, the clamping screw is defined with a gas outlet, and the gas outlet is in communication with the explosion-proof cavity.

By adopting the above technical solution, the clamping screw is screwed to the inner wall of the explosion-proof cavity, such that the end face of the safety sheet is driven to abut against the end face of the sealing pad to form a seal, thereby increasing an abutment force between the safety sheet and the sealing pad, so that the safety sheet is not easy to displace on the inner wall of the explosion-proof cavity, thereby improving the connection stability of the safety sheet on the inner wall of the explosion-proof cavity. When the gas pressure in the fluid channel increases and ruptures the safety sheet, the gas in the fluid channel passes through the explosion-proof cavity and is discharged from the gas outlet, achieving a depressurization in the fluid channel, making it difficult for the gas cylinder valve assembly to explode due to an excessive gas pressure, thereby improving the safety of the gas cylinder valve assembly in use.

Optionally, the valve rod is connected with a first sealing ring, and an outer wall of the first sealing ring abuts against the outer wall of the valve rod to form a seal with the first stepped surface.

By adopting the above technical solution, when the elastic force of the elastic element drives the outer wall of the valve rod to abut against the first stepped surface to form a seal, the outer wall of the first sealing ring abuts against the outer wall of the valve rod to form a seal with the first stepped surface, improving the sealing stability between the outer wall of the valve rod and the first stepped surface, achieving a separation of the cavity and the fluid channel, making it difficult for the gas in the fluid channel to overflow from the cavity, thereby improving the sealing stability of the gas cylinder valve assembly.

Optionally, an end face of the valve rod facing the hole is coaxially connected with a guide column, the guide column extends through the hole and guides the outer wall of the valve rod to abut against an outer wall of the column to form a seal.

By adopting the above technical solution, when the gas in the cavity drives the valve rod to slide in the direction towards the column, the guide column passes through the hole and guides the outer wall of the valve rod to abut against the outer wall of the column to form a seal, such that the valve rod is not easy to displace on the inner wall of the cavity, improving the sealing stability based on the abutment of the outer wall of the valve rod against the outer wall of the column.

Optionally, an outer wall of the guide column facing the valve rod is connected with a second sealing ring, and an outer wall of the second sealing ring abuts against the outer wall of the valve rod to form a seal with the end face of the column.

By adopting the above technical solution, when the outer wall of the valve rod abuts against the end face of the column to form a seal, the outer wall of the second sealing ring abuts against the outer wall of the valve rod to form a seal with the end face of the column, further improving the sealing stability of the outer wall of the valve rod and the end face of the column.

In a second aspect, a production process of the gas cylinder valve assembly is disclosed, which adopts the following technical solution.

A production process of a gas cylinder valve assembly is configured to produce the gas cylinder valve assembly, including the following steps:

delivering components and parts, including a valve body, a column, a valve rod, an elastic element and a spring clamp;

Mounting the valve rod and the valve body, wherein the end of the valve rod close to the cutting slot passes through the fluid channel and the cavity in sequence, the end of valve rod close to the cutting slot protrudes from the end face of valve body, and another end of valve rod is located in the fluid flow channel, the valve rod is coaxially inserted in the elastic element, the column is coaxially fixed at the end of the valve body close to the fluid channel, the two ends of the elastic element in the direction of elastic force respectively abut against the outer wall of the valve rod and the end face of the column, the elastic force of the elastic element drives the end face of valve rod to abut against the first stepped surface to form a seal, and the spring clamp is snapped and embedded in the outer wall of the valve rod protruding from the valve body;

Mounting the gas cylinder valve assembly, wherein the end of the valve body is connected to the gas cylinder;

Using the gas cylinder valve assembly, wherein the gas is injected into the inner cavity of the gas cylinder through the gas cylinder valve assembly, and the end of the valve rod is broken along the breaking zone of the cutting slot.

By adopting the above technical solution, the end of the valve body is connected to the gas cylinder to realize the mounting of the gas cylinder valve assembly on the gas cylinder, nitrous oxide and other dangerous goods are injected into the cavity, the gas pressure in the cavity increases, such that the valve rod is driven to slide in the direction towards the fluid channel, thereby a tightness between the valve rod and the first stepped surface disappears, such that the gas stably passes through the cavity and the fluid channel in sequence, and is injected into the inner cavity of the gas cylinder to achieve the injection of the gas in the gas cylinder. Before transporting the gas cylinder, the staff breaks off the valve rod along the breaking zone of the cutting slot, such that partial valve rod connected with the spring clamp is detached from the valve body. When the gas cylinder filled with dangerous goods such as nitrous oxide is exhausted, some outlaws want to inject nitrous oxide gas into the exhausted gas cylinder, the gas pressure would drive the valve rod to slide, such that the outer wall of the valve rod abuts against the end face of the column to form a seal, achieving the separation of the fluid channel and the hole, nitrous oxide gas cannot be stably injected into the gas cylinder again to avoid the reuse of the gas cylinder, thereby reducing the occurrence of illegal events.

In summary, the present application includes at least one of the following beneficial technical effects:
1. The cutting slot is configured, which ensures that the adjacent valve rods are not easy to collide with each other, which leads to gas leakage, thereby ensuring the sealing stability of the gas cylinder valve assembly to the inner cavity of the gas cylinder during transportation.
2. The spring clamp and the column are provided, to avoid repeated use of the gas cylinder, thereby reducing the occurrence of illegal events by criminals and improving the stability of social security.
3. The safety sheet is provided to reduce the occurrence of the burst of the gas cylinder and improve the filled stability of gas in the gas cylinder.

DETAILED DESCRIPTION

Figure 1:
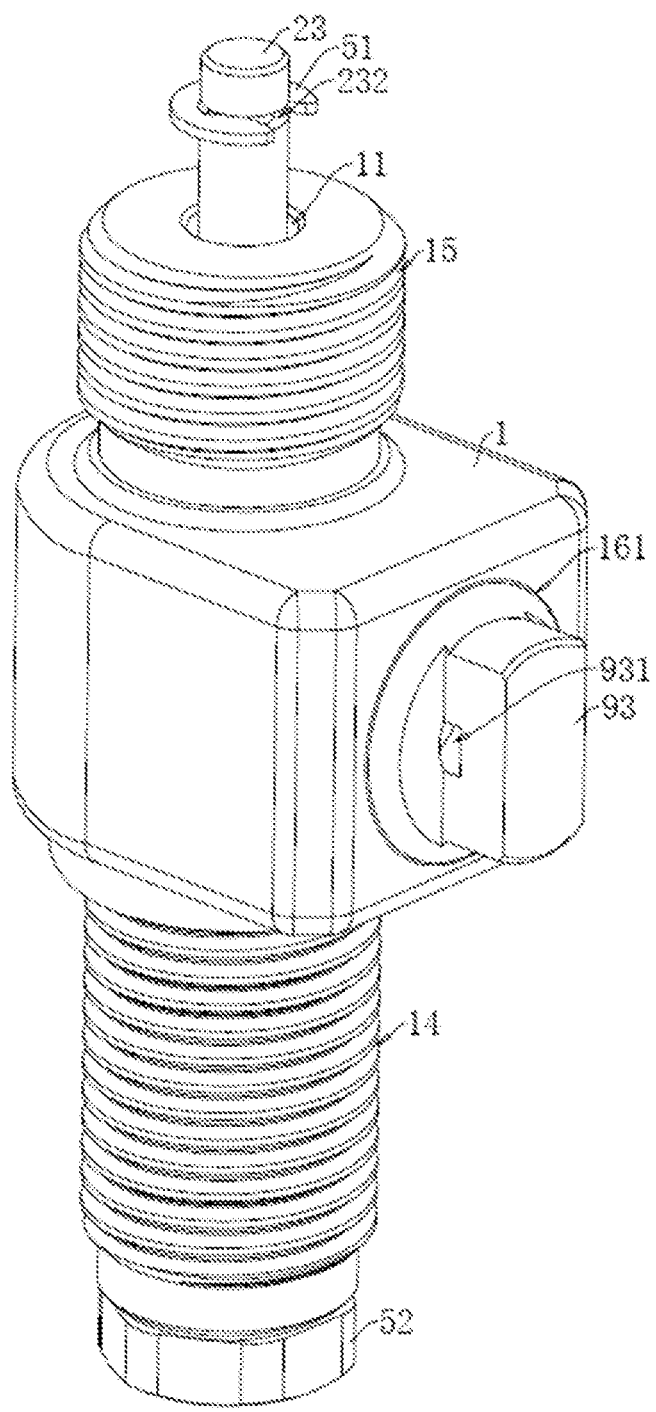
FIG. 1 is a schematic overall structure view according to an embodiment of the present application.

The present application is further described in detail below with reference to FIGS. 1-2.

A gas cylinder valve assembly is provided according to an embodiment of the present application. Referring to FIGS. 1 and 2, the gas cylinder valve assembly includes a valve body 1 and a valve rod 2, an end of the valve body 1 is configured to connect with a gas cylinder, and another end of the valve body 1 is configured to connect with an external pipeline, an end face of the valve body 1 facing the gas cylinder is configured with a fluid channel 12, an end face of the valve body 1 facing the external pipeline is defined with a cavity 11, the cavity 11 is in communication with the fluid channel 12. Both the cavity 11 and the fluid channel 12 are cylindrical cavities, an axis of the cavity 11 coincides with an axis of the fluid channel 12, the inner diameter of the cavity 11 is smaller than the inner diameter of the fluid channel 12, and a first stepped surface 13 is provided at the connection between the cavity 11 and the fluid channel 12.

Figure 2:
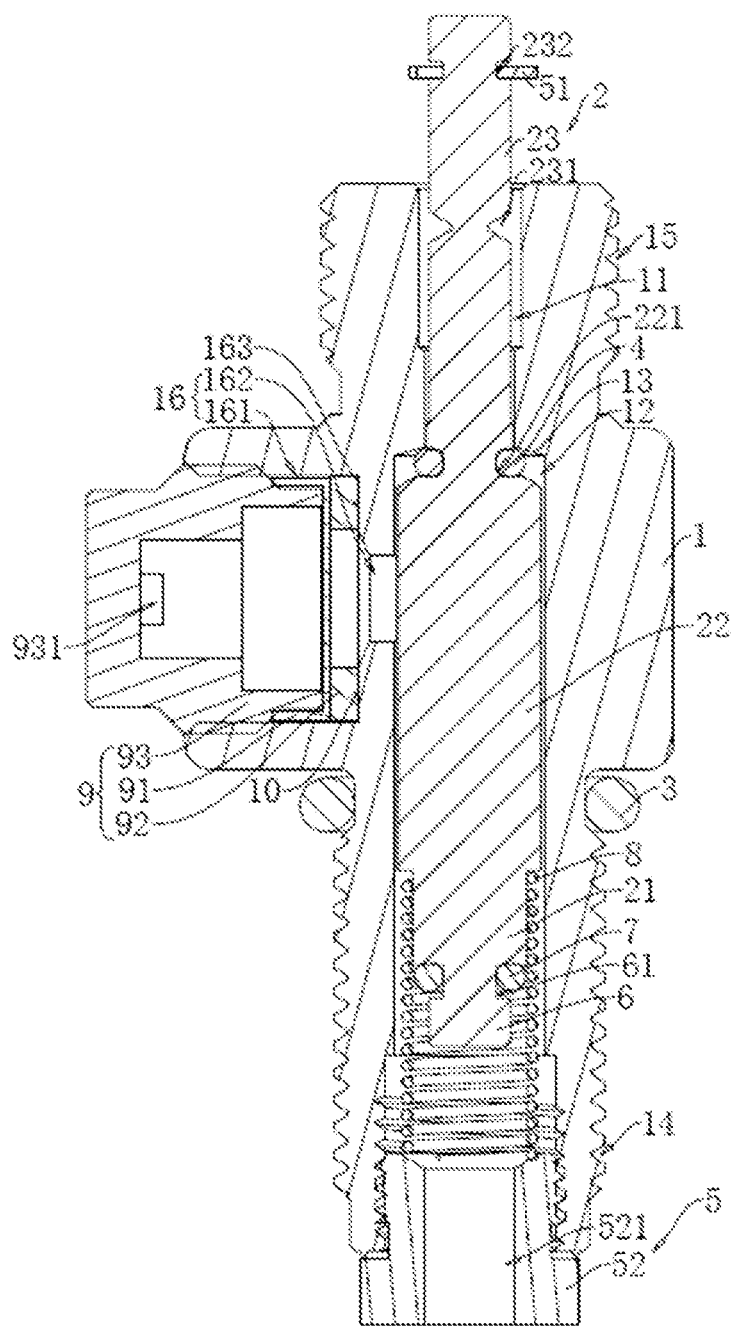
FIG. 2 is a schematic cross-section view according to an embodiment of the present application.

Referring to FIG. 2, an end of the valve rod 2 passes through the fluid channel 12 and the cavity 11 in sequence and protrudes from an outer wall of the valve body 1, another end of the valve rod 2 is located in the fluid channel 12, and an axis of the valve rod 2 coincides with the axis of the cavity 11. When the gas cylinder valve assembly is closed, the valve rod 2 slides along an inner wall of the cavity 11 in a direction departing from the fluid channel 12, an outer wall of the valve rod 2 abuts against the first stepped surface 13 to form a seal, thereby achieving a separation of the cavity 11 and the fluid channel 12. When the gas cylinder valve assembly is opened, the valve rod 2 is pressed to slide in a direction towards the fluid channel 12, the outer wall of the valve rod 2 is detached from the first stepped surface 13, and the cavity 11 is in communication with the fluid channel 12.

Referring to FIG. 2, the valve rod 2 includes a limit section 21, a seal section 22 and a drive section 23, wherein the limit section 21, the seal section 22 and the drive section 23 are fixed at their ends in sequence, and an axis of the limit section 21, an axis of the seal section 22 and an axis of the drive section 23 coincide with each other. A diameter of the seal section 22, a diameter of the limit section 21 and a diameter of the drive section 23 decrease gradually. When the valve rod 2 passes through the fluid channel 12 and the cavity 11 in sequence, the limit section 21 and the seal section 22 are located in the fluid channel 12, an end face of the seal section 22 facing the drive section 23 is configured to abut against the first stepped surface 13 to form a seal, the drive section 23 is located in the cavity 11, and an end of the drive section 23 departing from an end of the seal section 22 protrudes from the end of the valve body 1.

Referring to FIG. 2, the seal section 22 is connected with a first sealing ring 4, the first sealing ring 4 is made of EPDM in the embodiment of the present application, which is deformable to a certain extent. The circumferential outer wall of the seal section 22 close to the drive section 23 is defined with a connecting annular slot 221, the first sealing ring 4 is embedded in the connecting annular slot 221, and an inner wall of the first sealing ring 4 abuts against an inner wall of the connecting annular slot 221 to form a seal. When the outer wall of the seal section 22 abuts against the first stepped surface 13 to form the seal, the outer wall of the first sealing ring 4 abuts against the first stepped surface 13 and the outer wall of the seal section 22 to form a seal, thereby increasing a sealing stability between the outer wall of the seal section 22 and the first stepped surface 13.

Referring to FIG. 2, a circumferential outer wall of the drive section 23 located in the cavity 11 is defined with a cutting slot 231, a breaking zone is formed at the position corresponding to the cutting slot 231. The cutting slot 231 can be cut on one side of the outer wall of the drive section 23, or can be cut on the circumferential outer wall of the drive section 23 evenly spaced from each other. The retaining part of the drive section at the slot is configured to be broken off, the cutting slot 231 is a cutting annular slot in the embodiment of the present application. When the gas cylinder with dangerous goods such as nitrous oxide is transported, the staff breaks off the drive section 23 along the breaking zone of the cutting slot 231, such that the end of the drive section 23 is located in the cavity 11, so that the valve rods 2 of adjacent gas cylinders do not tend to collide with each other and thereby slide, thereby ensuring the sealing stability of the gas cylinder valve assembly to the inner cavity of the gas cylinder.

Referring to FIG. 2, the valve body 1 is connected with a element 5, which includes a spring clamp 51 and a column 52, the column 52 is a hexagonal hollow screw in the embodiment of the present application, and an end of the column 52 is screwed to the inner wall of the fluid channel 12. The column 52 is welded to the valve body 1 at the connection between them to form a seal, so that the gas in the fluid channel 12 is not easy to overflow from the connection between the column 52 and the valve body 1, thereby ensuring the sealing stability of the gas cylinder valve assembly.

Referring to FIG. 2, an axis of the column 52 coincides with the axis of the fluid channel 12, the column 52 is configured with a hole 521, and an axis of the hole 521 coincides with the axis of the column 52, the hole 521 passes through an outer wall of the column 52 along its own axis, and the hole 521 is in communication with the fluid channel 12. An end face of the column 52 facing the fluid channel 12 is configured to abut against the outer wall of the limit section 21 to form a seal.

Referring to FIG. 2, the spring clamp 51 is an E-shaped spring clamp in the embodiment of the present application. The circumferential outer wall of the drive section 23 protruding from the valve body 1 is defined with an annular slot 232 for insertion in of the spring clamp 51. When the gas cylinder is inflated, the gas pressure drives the seal section 22 to slide in a direction towards the column 52, the end face of the seal section 22 is detached from the first stepped surface 13, and an end face of the spring clamp 51 abuts against the outer wall of the valve body 1 for limitation, thereby preventing the outer wall of the seal section 22 from contacting the end face of the column 52, such that the cavity 11, the fluid channel 12 and the hole 521 are in communication with each other, the gas flows through the cavity 11, the fluid channel 12, and the hole 521 in sequence and is stably injected into the inner cavity of the gas cylinder, such that the gas cylinder is filled with gas.

Referring to FIG. 2, before selling the gas cylinder, the staff breaks off the drive section 23 along the breaking zone of the cutting slot 231, such that the drive section 23 embedded with the spring clamp 51 is detached from the drive section 23 which is located in the cavity 11. When the gas cylinder filled with dangerous goods such as nitrous oxide is exhausted and some outlaws want to inject nitrous oxide and other dangerous goods into the gas cylinder, the gas pressure drives the valve rod 2 to slide in a direction towards the guide column 6, such that the outer wall of the valve rod 2 abuts against the end face of the guide column 6 to form a seal, the fluid channel 12 is detached from the hole 521, making it difficult for the gas to be injected into the gas cylinder through the gas cylinder valve assembly, and making it impossible to reuse the gas cylinder, thereby reducing an occurrence of illegal events and improving a social security and safety.

Referring to FIG. 2, the end face of the limit section 21 facing the column 52 is coaxially welded and fixed with the guide column 6, a diameter of the guide column 6 is smaller than an inner diameter of the hole 521. The guide column 6 is connected with a second sealing ring 7, the second sealing ring 7 is made of EPDM in the embodiment of the present application, which is deformable to a certain extent. A limit annular slot 61 is defined in the circumferential outer wall of the guide column 6 close to the limit section 21, and the second sealing ring 7 is embedded in the limit annular slot 61. An axis of the second sealing ring 7 coincides with an axis of the guide column 6, and the inner wall of the second sealing ring 7 abuts against the inner wall of the limit annular slot 61 to achieve a fixation. When the guide column 6 passes through the hole 521, the outer wall of the seal section 22 is guided to abut against the end face of the column 52 to form a seal, and the outer wall of the second sealing ring 7 abuts against the end face of the guide column 6 to achieve a seal with the outer wall of the second sealing ring 7, thereby improving the sealing stability of the outer wall of the seal section 22 and the end face of the column 52.

Referring to FIG. 2, the valve rod 2 is connected with an elastic element 8, which can be a compression spring or a torsion spring, the elastic element 8 is a compression spring in the embodiment of the present application, which is deformable to a certain extent. The elastic element 8 is coaxially sleeved on the outer wall of the limit section 21, and the direction of elastic force of the elastic element 8 coincides with the axis of the limit section 21. Two ends of the elastic element 8 in the direction of elastic force respectively abut against the outer wall of the seal section 22 and the end face of the guide column 6. The elastic force of the elastic element 8 drives the seal section 22 to slide in the direction towards the first stepped surface 13, such that the end face of the seal section 22 abuts against the first stepped surface 13, tending to achieve a sealing trend.

Referring to FIG. 2, the valve body 1 is connected with an explosion-proof element 9 which is configured for depressurization when the gas pressure in the inner cavity of the fluid channel 12 is too high. The outer wall of the valve body 1 is defined with an explosion-proof cavity 16 for accommodating the explosion-proof element 9, the explosion-proof cavity 16 is a cylindrical cavity, and an axis of the explosion-proof cavity 16 is perpendicular to the axis of the fluid channel 12. The explosion-proof cavity 16 includes an accommodating section 161 and a communicating section 162, ends of the accommodating section 161 and the communicating section 162 are in communication with each other, and the end of the communicating section 162 departing from the accommodating section 161 is in communication with the fluid channel 12.

Referring to FIG. 2, an inner diameter of the accommodating section 161 is greater than an inner diameter of the communicating section 162. A second stepped surface 163 is formed at the connection between the accommodating section 161 and the communicating section 162, an end face of the second stepped surface 163 is fixed with an abutment ring 10, and an axis of the abutment ring 10 coincides with an axis of the accommodating section 161. The explosion-proof element 9 includes a safety sheet 91, a sealing pad 92, and a clamping screw 93. The safety sheet 91 is made of nickel in the embodiment of the present application, which has a certain anti-pressure ability, the sealing pad 92 is a brass sheet in the embodiment of the present application, which is deformable to a certain extent.

Referring to FIG. 2, when the sealing pad 92 and the safety sheet 91 are embedded in the accommodating section 161 in sequence, one end of the sealing pad 92 abuts against the second stepped surface 163 and an outer wall of the abutment ring 10, another end of the sealing pad 92 abuts against an outer wall of the safety sheet 91, and the circumferential outer wall of the safety sheet 91 abuts against an inner wall of the accommodating section 161 to form a seal. The clamping screw 93 is in thread connection with the inner wall of the accommodating section 161, and an end face of the clamping screw 93 abuts against the end face of the safety sheet 91 and drives the end face of the safety sheet 91 to abut against an end face of the sealing pad 92 for fixation. The sealing pad 92 is pressed by the safety sheet 91, such that the sealing pad 92 abuts against the outer wall of the abutment ring 10, a reaction force of the abutment ring 10 on the sealing pad 92 makes the sealing pad 92 deform, thereby increasing a contact area between the sealing pad 92 and the abutment ring 10, thereby improving a sealing strength of the sealing pad 92 against an inner wall of the explosion-proof cavity 16.

Referring to FIG. 2, an end face of the clamping screw 93 departing from the safety sheet 91 is defined with a gas outlet 931, an axis of the gas outlet 931 coincides with the axis of the accommodating section 161, and the gas outlet 931 is in communication with the accommodating section 161. When the gas pressure in the fluid channel 12 is too high, the gas in the fluid channel 12 enters the accommodating section 161 through the communicating section 162, the gas pressure ruptures the safety sheet 91, therefore the sealing effect of the safety sheet 91 on the accommodating section 161 disappears, the gas in the fluid channel 12 flows through the communicating section 162, the accommodating section 161 in sequence, and is discharged from the gas outlet 931, achieving the pressure relief for the fluid channel 12, such that the gas cylinder valve assembly doesn't tend to explode due to excessive gas pressure, thereby improving the safety of the gas cylinder valve assembly.

Referring to FIG. 2, the end of the valve body 1 is circumferentially defined with a first threaded hole 14 which is joined with an inlet end of the gas cylinder with threaded connection, a third sealing ring 3 is coaxially sheathed on the outer wall of the valve body 1, the third sealing ring 3 is made of EPDM in the embodiment of the present application, which is deformable to a certain extent. When an inner wall of the first threaded hole 14 is screwed down on the inlet end of the gas cylinder, an outer wall of the third sealing ring 3 abuts against the outer wall of the valve body 1 to form a seal with an outer wall of the inlet end of the gas cylinder, such that the gas in the gas cylinder doesn't tend to overflow from the connection between the gas cylinder valve assembly and the gas cylinder, thereby improving the seal stability of the gas cylinder.

Referring to FIG. 2, the end of the valve body 1 departing from the third sealing ring 3 is circumferentially defined with a second threaded hole 15 that is screwed to the external pipeline. When an end of the external pipeline is tightened with an inner wall of the second threaded hole 15, the connection between the gas cylinder valve assembly and the external pipeline is achieved.

An implementation principle of the gas cylinder valve assembly in the embodiment of the present application is: when the gas cylinder with dangerous goods such as nitrous oxide is transported, the staff breaks the drive section 23 along the breaking zone of the cutting slot 231, such that the end of the drive section 23 is located in the cavity 11, thereby the valve rods 2 of adjacent gas cylinders don't tend to collide with each other and slide, thereby ensuring the sealing stability of the gas cylinder valve assembly to the inner cavity of the gas cylinder.

A production process of the gas cylinder valve assembly is further disclosed, which is configured to produce a gas cylinder valve, including the following steps:

Delivering components and parts, including the valve body 1, the column 52, the clamping screw 93, the valve rod 2, the first sealing ring 4, the second sealing ring 7, the elastic element 8, the sealing pad 92, the safety sheet 91 and the spring clamp 51;

mounting the first sealing ring 4 and the second sealing ring 7, wherein the first sealing ring 4 is coaxially embedded in the connecting annular slot 221, while the second sealing ring 7 is coaxially embedded in the limit annular slot 61, achieving assembling of the first sealing ring 4 and the second sealing ring 7 on the valve rod 2;

mounting the valve rod 2 and the valve body 1, wherein the end of the valve rod 2 close to the cutting slot 231 passes through the fluid channel 12 and the cavity 11 in sequence, until the end of valve rod 2 close to the cutting slot 231 protrudes from the end face of valve body 1, while another end of valve rod 2 is located in the fluid channel 12, wherein the elastic element 8 is coaxially sheathed on the guide column 6 and the limit section 21 in sequence, the end of the column 52 is coaxially threaded to the inner wall of the fluid channel 12, the two ends of the elastic element 8 in the direction of elastic force respectively abut against the outer wall of the seal section 22 and the end face of the column 52, the elastic force of the elastic element 8 drives the end face of valve rod 2 to abut against the first stepped surface 13 to form a seal, and the spring clamp 51 is snapped and embedded in the annular slot 232;

assembling the explosion-proof element 9, wherein the sealing pad 92 and the safety sheet 91 are embedded in the explosion-proof cavity 16 in sequence, the clamping screw 93 is screwed to the inner wall of explosion-proof cavity 16, such that the end face of the clamping screw 93 abuts against the end face of safety sheet 91 for fixation and drives the end face of the safety sheet 91 to abut against the end face of sealing pad 92 to form a seal;

mounting the gas cylinder valve assembly, wherein the third sealing ring 3 is coaxially sheathed on the outer wall of the valve body 1, the inner wall of the first threaded hole 14 is screwed to the gas cylinder, such that the outer wall of the third sealing ring 3 abuts against the outer wall of the valve body 1 to form a seal with the outer wall of the gas cylinder;

using the gas cylinder valve assembly, wherein the gas is filled into the inner cavity of the gas cylinder through the gas cylinder valve assembly, and the end of the valve rod 2 is broken along the breaking zone of the cutting slot 231.

The implementation principle of the production process of the gas cylinder valve assembly in the embodiment of the present application is: the inner wall of the first threaded hole 14 is screwed to the gas cylinder to mount the gas cylinder valve assembly on the gas cylinder; and then dangerous goods such as nitrous oxide are injected into the cavity 11, such that the gas pressure in the cavity 11 increases and drives the valve rod 2 to slide in the direction towards the fluid channel 12, thereby a tightness between the valve rod 2 and the first stepped surface 13 disappears, the gas flows through the cavity 11 and the fluid channel 12 in sequence, and is injected into the inner cavity of the gas cylinder to achieve the gas filling; before transporting the gas cylinder, the staff breaks the valve rod 2 along the breaking zone of the cutting slot 231, such that the partial valve rod 2 connected with the spring clamp 51 is detached from the valve body 1, when the gas cylinder filled with dangerous goods such as nitrous oxide is exhausted, some outlaws want to inject nitrous oxide gas into the exhausted gas cylinder, the gas pressure drives the valve rod 2 to slide, the outer wall of the valve rod 2 abuts against the end face of the column 52 to form a seal, thereby achieving the separation of the fluid channel 12 and the hole 521, the nitrous oxide gas cannot be stably injected into the gas cylinder again, thereby avoiding the reuse of the gas cylinder, thereby reducing the occurrence of illegal events.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS 1 valve body
11 cavity
12 fluid channel
13 first stepped surface
14 first threaded hole
15 second threaded hole
16 explosion-proof cavity
161 accommodating section
162 communicating section
163 second stepped surface
2 valve rod
21 limit section
22 seal section
221 connecting annular slot
23 drive section
231 cutting slot
232 annular slot
3 third sealing ring
4 first sealing ring
5 element
51 spring clamp
52 column
521 hole
6 guide column
61 limit annular slot
7 second sealing ring
8 elastic element
9 explosion-proof element
91 safety sheet
92 sealing pad
93 clamping screw
931 gas outlet
10 abutment ring

What is claimed is:

1. A gas cylinder valve assembly, comprising: a valve body and a valve rod, an end of the valve body is configured to connect with a gas cylinder, a first end face of the valve body facing the gas cylinder is configured with a fluid channel, a second end face of the valve body departing from the gas cylinder is defined with a cavity, the cavity is in communication with the fluid channel, a first stepped surface is provided at a connection between the cavity and the fluid channel, the valve rod comprises a limit section, a seal section and a drive section, the valve rod is connected with an elastic element, when the valve rod passes through the fluid channel and the cavity in sequence, the limit section and the seal section are located in the fluid channel, an elastic force of the elastic element drives an end face of the seal section facing the drive section to abut against the first stepped surface to form a first seal, the drive section is located in the cavity, an end of the drive section away from an end of the seal section protrudes from the second end face of the valve body, a circumferential outer wall of the valve rod in the cavity is defined with a cutting slot, and a breaking zone is formed at a position corresponding to the cutting slot, wherein the valve body is connected with a column, the column is coaxially connected to the end of the valve body, the end face of the column facing the valve rod is defined with a hole, the hole is in communication with the fluid channel, wherein a spring clamp is connected to the circumferential outer wall of the valve rod protruding from the valve body, and when a gas pressure drives the valve rod to slide, the end face of the seal section facing the drive section is detached from the first stepped surface and an end face of the spring clamp abuts against an outer wall of the valve body, thereby preventing an outer wall of the seal section from contacting the end face of the column facing the valve rod, such that the cavity, the fluid channel and the hole are in communication with each other, wherein, after the valve rod is broken at the breaking zone, the end face of the column facing the valve rod is configured to abut against the circumferential outer wall of the valve rod to form a second seal.

2. The gas cylinder valve assembly according to claim 1, wherein the valve body is connected with an explosion-proof element, the outer wall of the valve body is defined with an explosion-proof cavity for accommodating the explosion-proof element, the explosion-proof cavity is in communication with the fluid channel, the explosion-proof element comprises a safety sheet, a circumferential outer wall of the safety sheet abuts against an inner wall of the explosion-proof cavity to form a third seal, and when the gas pressure in the fluid channel increases, the safety sheet is squeezed to rupture.

3. The gas cylinder valve assembly according to claim 2, wherein the explosion-proof element further comprises a sealing pad, and an outer wall of the sealing pad abuts against the circumferential outer wall of the safety sheet to form a fourth seal with a bottom wall of the explosion-proof cavity.

4. The gas cylinder valve assembly according to claim 3, wherein the inner wall of the explosion-proof cavity is connected with an abutment ring, and an outer wall of the abutment ring abuts against the outer wall of the sealing pad to form a fifth seal.

5. The gas cylinder valve assembly according to claim 3, wherein the explosion-proof element further comprises a clamping screw, the clamping screw is screwed to the inner wall of the explosion-proof cavity, the clamping screw drives the safety sheet to abut against an end face of the sealing pad to form a fifth seal, the clamping screw is defined with a gas outlet, and the gas outlet is in communication with the explosion-proof cavity.

6. The gas cylinder valve assembly according to claim 1, wherein the valve rod is connected with a first sealing ring, and an outer wall of the first sealing ring abuts against the circumferential outer wall of the valve rod to form the first seal with the first stepped surface.

7. The gas cylinder valve assembly according to claim 1, wherein a second end face of the valve rod facing the hole is coaxially connected with a guide column, and the guide column extends through the hole and guides the circumferential outer wall of the valve rod to abut against an outer wall of the column to form the second seal.

8. The gas cylinder valve assembly according to claim 7, wherein an outer wall of the guide column facing the valve rod is connected with a second sealing ring, and an outer wall of the second sealing ring abuts against the circumferential outer wall of the valve rod to form the second seal with the end face of the column.

\* \* \* \* \*